United States Patent
Aust et al.

(10) Patent No.: US 10,393,152 B2
(45) Date of Patent: Aug. 27, 2019

(54) STAMP-SEALING UNIT AND ULTRASONIC PROCESSING DEVICE COMPRISING SAME

(71) Applicant: Herrmann Ultraschalltechnik GmbH & Co. KG, Karlsbad (DE)

(72) Inventors: Volker Aust, Birkenfeld (DE); Andreas Schmid, Pforzheim (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 0 days.

(21) Appl. No.: 16/084,592

(22) PCT Filed: Apr. 26, 2017

(86) PCT No.: PCT/EP2017/059869
§ 371 (c)(1),
(2) Date: Sep. 13, 2018

(87) PCT Pub. No.: WO2017/186764
PCT Pub. Date: Nov. 2, 2017

(65) Prior Publication Data
US 2019/0078591 A1  Mar. 14, 2019

(30) Foreign Application Priority Data

Apr. 28, 2016 (DE) .................. 10 2016 107 958

(51) Int. Cl.
*B32B 37/00* (2006.01)
*F15B 15/14* (2006.01)
(Continued)

(52) U.S. Cl.
CPC .......... *F15B 15/1452* (2013.01); *B29C 65/08* (2013.01); *B29C 65/749* (2013.01);
(Continued)

(58) Field of Classification Search
USPC ...................................... 156/580.1
See application file for complete search history.

(56) References Cited

U.S. PATENT DOCUMENTS 7,469,455 B2 * 12/2008 Distel ............... B26F 1/02
29/33 R
7,959,054 B2  6/2011 Konieczka
(Continued)

FOREIGN PATENT DOCUMENTS

CH        687366 A5    11/1996
DE        9212560      3/1993
(Continued)

OTHER PUBLICATIONS

Nora Lindner, International Preliminary Report on Patentability, PCT/EP2017/059869, World Intellectual Property Organization, Nov. 1, 2018.

*Primary Examiner* — James D Sells
(74) *Attorney, Agent, or Firm* — Paul & Paul (57) ABSTRACT

The invention relates to a stamp-sealing unit comprising a punch designed as a sonotrode (8), and a die (5), said die (5) having an opening (15) and the punch being able to be moved in and out of the opening (15) in the stamping direction. The invention also relates to an ultrasonic processing device for stamping stamped parts out of a stamping material (2) and for sealing the stamped parts to unprocessed products (21).

18 Claims, 6 Drawing Sheets

(51) Int. Cl.

| | | |
|---|---|---|
| *B29C 65/08* | (2006.01) | |
| *B29C 65/74* | (2006.01) | |
| *B29C 65/78* | (2006.01) | |
| *B29C 65/00* | (2006.01) | |
| *B29C 69/00* | (2006.01) | |
| *F02F 5/00* | (2006.01) | |
| *F16J 1/00* | (2006.01) | |
| *F16J 9/04* | (2006.01) | |
| *F16J 15/18* | (2006.01) | |

(52) U.S. Cl.
CPC ...... *B29C 65/7437* (2013.01); *B29C 65/7441* (2013.01); *B29C 65/7443* (2013.01); *B29C 65/7847* (2013.01); *B29C 66/112* (2013.01); *B29C 66/114* (2013.01); *B29C 66/1122* (2013.01); *B29C 66/472* (2013.01); *B29C 66/5326* (2013.01); *B29C 66/816* (2013.01); *B29C 66/8167* (2013.01); *B29C 66/8322* (2013.01); *B29C 66/8414* (2013.01); *B29C 69/005* (2013.01); *F02F 5/00* (2013.01); *F16J 1/008* (2013.01); *F16J 9/04* (2013.01); *F16J 15/188* (2013.01)

(56) References Cited

U.S. PATENT DOCUMENTS

| | | | |
|---|---|---|---|
| 9,393,766 | B2 | 7/2016 | Voigt et al. |
| 9,630,361 | B2* | 4/2017 | Scheu ............... B29C 65/081 |
| 2005/0223549 | A1* | 10/2005 | Braun ............... B23K 26/0093 |
| | | | 29/799 |

FOREIGN PATENT DOCUMENTS

| | | |
|---|---|---|
| DE | 102006020418 A1 | 10/2007 |
| DE | 102013223379 A1 | 5/2015 |
| EP | 1043146 A1 | 10/2000 |
| JP | S56129130 A | 10/1981 |
| WO | 2012152798 A1 | 11/2012 |
| WO | 2017186764 A1 | 11/2017 |

* cited by examiner

STAMP-SEALING UNIT AND ULTRASONIC PROCESSING DEVICE COMPRISING SAME

CROSS-REFERENCE TO RELATED APPLICATIONS

This application is a 371 national stage application of International Application PCT/EP2017/059869, filed Apr. 26, 2017, and claims the priority of German Application No. 10 2016 107 958.8, filed on Apr. 28, 2016.

The present invention relates to a stamp-sealing unit with a punch formed as a sonotrode and a die, wherein the die has an opening and the punch can be moved into and out of the opening in the stamping direction. Furthermore, the present invention relates to an ultrasonic processing device for stamping stamped parts out of stamping material and for sealing the stamped parts to unprocessed products.

In industry there are a variety of applications in which a stamped part is stamped out of a stamping material and is sealed to a product in a further processing step.

For example, membranes acting as pressure equalization elements are incorporated into electronic housings and also into lights and headlights. These pressure equalization elements make possible a pressure equalization which in turn leads to a lower load on seals that may be present and thus reduced leakages. In so far as the membrane is permeable, moisture can also escape from the housing.

As a rule, the correspondingly stamped-out and prefabricated membranes are provided via a carrier strip and welded or sealed to the product, such as e.g. the housing. Alternatively, membrane elements can also be manufactured by means of injection moulding and screwed or clipped to the housing.

An ultrasonic processing machine has recently been developed by the applicant, which, in a single operation, mechanically stamps a membrane out of a material strip and seals it onto a plastic moulded part by means of ultrasound. For this, a conventional ultrasonic processing device has been used, in which an ultrasonic oscillating unit consisting of a sonotrode and a converter is held in a feed unit that can be actuated by means of a drive unit. The sonotrode can be connected to the converter, optionally via an amplitude transformation unit. The feed unit is connected to a device frame with the result that, by controlling the drive unit, the position of the ultrasonic oscillating unit can be moved back and forth in one direction relative to the machine frame. In the case of the machine developed, a die which has been accommodated in a die plate has been firmly connected to the machine frame, with the result that, through the movement of the ultrasonic oscillating unit, the sonotrode could be moved into the opening of the die, in order to stamp the membrane out of the membrane strip.

The advantage of this machine is that the use of prefabricated membranes which first have to be applied to a carrier strip can be dispensed with. Instead, the membranes are stamped out directly before connection to the product, such as e.g. the housing.

However, it is very laborious to adjust this machine, as punch and die have to be precisely aligned to each other. A reliable stamping process is ensured only when the inner contour of the die does not differ too much from the outer contour of the sonotrode.

Therefore, not only does the die plate have to be precisely aligned with respect to the frame but, in addition, increased requirements have to be fulfilled with respect to the tolerances in the case of the connection between frame and transport slide, or between transport slide and ultrasonic oscillating unit.

Furthermore, because the feed unit is held on the frame on one side only, bendings with respect to the frame can occur which can no longer be compensated for by corresponding alignment of the sonotrode.

Figure 1:
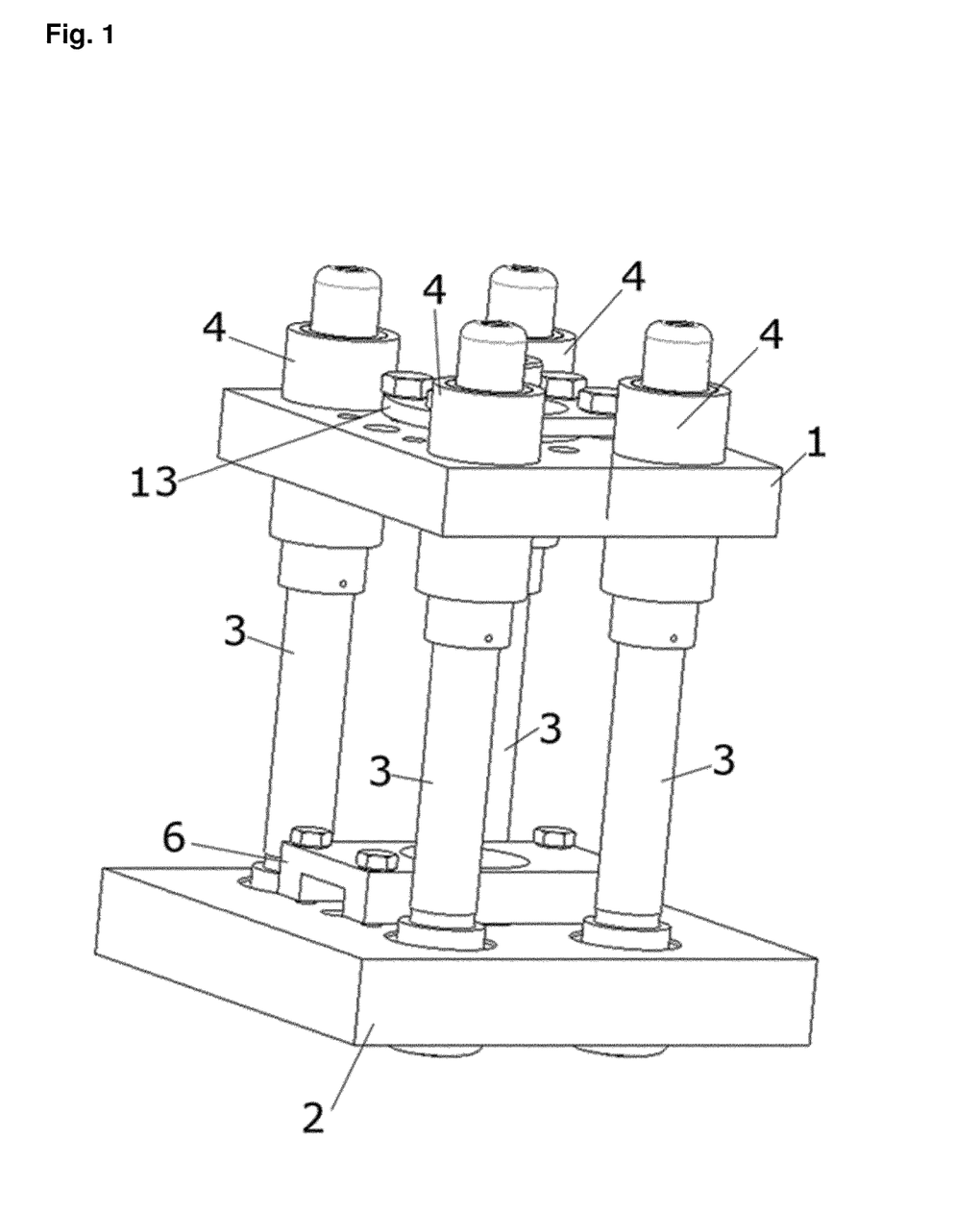
FIG. 1 a perspective view of a stamp-sealing unit according to the invention.

Document JP S5612930 A shows a device for mounting and adjusting a sonotrode in an ultrasound welding apparatus in FIG. 1. In this case, the sonotrode has a flange, which is clamped by means of a screw between a lower holding ring and an upper holding ring. The upper holding ring is likewise fastened on a sonotrode plate by a screw.

Document EP 1 043 146 A1 proposes a method and a device for applying straws to flexible containers by means of ultrasound welding. For example, FIGS. 1 and 2 in this document will likewise represent mounting of a sonotrode.

Document CH 687366 A5 relates to a device for stamping out a connecting part and for welding the latter. This document proposes, for example, a negative pressure line opening into a welding stamp so that a stamped connecting part can be prevented from slipping or falling down.

The alignment of the tools with respect to each other and in particular the adjustment of the sonotrode represents a major challenge during commissioning, with the result that as a rule a technician especially trained by the plant manufacturer is needed for this purpose. An insufficient alignment leads to increased wear of the tools as well as disturbances of the stamp-sealing process.

In any case replacing the die or the sonotrode punch in order, for example, to change the size of the membranes to be stamped and to be welded, is possible only with great effort which, as a rule, cannot be undertaken by the user of the ultrasonic processing device.

The object of the present invention is therefore to specify a stamp-sealing unit which at least reduces the named problems.

According to the invention this is achieved in that a sonotrode plate is provided with a sonotrode plate opening for accommodating the sonotrode, wherein the sonotrode has a flange, and the sonotrode plate opening has an inner contour with a stop surface and the flange has an outer contour with a stop surface, wherein the two stop surfaces are formed corresponding to each other with the result that, when the sonotrode is accommodated in the sonotrode plate opening, the stop surfaces lie against each other, the inner contour having an inner cone and the outer contour having an outer cone, which is configured to correspond to the inner cone.

Through this measure, an easy alignment of the sonotrode with respect to the sonotrode plate is possible. Therefore, once the sonotrode plate is correctly positioned, the sonotrode can easily be replaced by another sonotrode. As soon as the corresponding stop surfaces lie against each other, the sonotrode is correctly positioned relative to the sonotrode plate.

The conical outer contour of the flange and the inner contour, corresponding thereto, of the sonotrode plate have the advantage that alignment of the sonotrode, and therefore of the stamp, relative to the sonotrode plate can be carried out simply. The flange of the sonotrode merely needs to be placed in the opening of the sonotrode plate. Because of the corresponding conical sections, the sonotrode is automatically aligned almost precisely relative to the sonotrode plate. In this case, a high concentric accuracy and a high coaxiality of the sonotrode axis and the outer cone axis are advantageous.

The flange can be formed in one piece with the sonotrode. Alternatively the flange can also be manufactured separately from the sonotrode and connected thereto. To fasten the flange to the sonotrode, it can for example be shrunk on or soldered or welded thereto.

For example, the sonotrode can be designed rotationally symmetrical, e.g. with a circular cross-section, and the flange can protrude in one direction radially to the rotation axis over the outer surface of the sonotrode and be designed circumferential. The sonotrode plate holds the flange such that the sonotrode can oscillate as freely as possible. Alternatively, the punch can also have a non-circular cross-section. Alternatively, the flange can also be interrupted in the circumferential direction.

In proximity to the outer surface of the sonotrode, the flange optionally has a section with a reduced axial extent, in order to influence the oscillation behaviour of the sonotrode due to the fastening of the flange to the sonotrode plate as little as possible. Moreover, the flange is preferably connected to the sonotrode in an area in which, in the case of resonant excitation of the sonotrode with an ultrasonic oscillation, there is an oscillation minimum of the longitudinal oscillation.

In a preferred embodiment, to fasten the sonotrode to the sonotrode plate, a clamping element is provided, which is arranged such that it prevents a movement of the sonotrode or the sonotrode flange in axial direction (stamping direction) relative to the sonotrode plate. This clamping element can for example consist of a sleeve with a collar element, wherein the sleeve is positioned inside the sonotrode plate opening and the collar element is fastened to the sonotrode plate. The fastening to the sonotrode plate can be effected for example using one or more screws. Alternatively, the clamping element can also be formed as a socket with an external thread, which can be screwed into an internal thread in the sonotrode plate.

In a further preferred embodiment, the die is fastened to the die plate and the die plate has a die plate opening into which the die is inserted. For example, the die plate opening can have an inner cone and the die can have an outer cone, wherein the outer cone of the die is formed corresponding to the inner cone of the die plate opening. Here too, the die can be simply oriented relative to the die plate opening. Alternatively, non-conical corresponding stop surfaces are also possible. The die is preferably formed in one piece. Alternatively, it can also be formed in several pieces.

In a preferred embodiment, a die clamping unit is provided, which is preferably fastened to the die plate with one or more screws and is preferably in contact, at least in sections, with the die.

The die clamping unit can have an opening which is flush with the die opening, wherein, preferably between die clamping unit and die, a gap is formed in sections, for feeding in stamping material. The die clamping unit then also serves for guiding the stamping material.

In order to simplify the production of sonotrode plate and die plate, these can be laid on top of each other, screwed to each other and the openings with the inner cones can then be introduced. It is therefore preferable for the inner cones of the sonotrode plate and the die plate as well as the outer cones of sonotrode flange and die to have the same cone angle in each case.

In a further preferred embodiment, the sonotrode plate is connected, via a straight guide and preferably a column guide, to the die or the die plate to which the die is fastened. By a "column guide" is meant a guide which comprises at least one guide column and at least one guide bushing. The guide column can be moved sliding or rolling inside the guide bushing. For example, the guide column can be fastened to the die plate and the sonotrode plate can have a guide bushing with the result that, through a movement of the plate relative to the guide column, a relative movement between sonotrode plate and die plate is realized.

The guide bushing can be fastened both as a separate component to the sonotrode plate, or moulded into the sonotrode plate in one piece.

In other words, the sonotrode plate which holds the sonotrode and the die plate which holds the die are now directly connected to each other via a column guide and not, as in the state of the art, via a transport slide which in turn is connected to the machine frame.

Alternatively the guide column can be fastened to the sonotrode plate and the die plate can have a guide bushing.

An arrangement of the unit, i.e. an alignment between sonotrode and die, can thereby even be effected outside the ultrasonic processing device.

In a preferred embodiment, the column guide has at least two columns which are screwed to the die plate. Furthermore, the sonotrode plate has guide openings for accommodating the columns, wherein a guide sleeve is preferably arranged between the columns and the guide openings in each case.

Because of the column guide of sonotrode plate and die plate, they are aligned to each other with very high precision. The formation of die and/or sonotrode flange with outer cone can now effect a precise alignment of die or sonotrode flange to die plate or sonotrode plate respectively.

In a particularly preferred embodiment, the sonotrode has a fluid channel with an inlet which is arranged on the surface of the sonotrode facing the die. The outlet of the fluid channel can be connected to a vacuum source or compressed air source.

By applying a vacuum, the guiding of the stamped part after stamping out, up to the sealing position can be improved, as the stamped part is held on the punch. After completion of the sealing process, the fluid channel can be supplied with compressed air in order to release the sealed stamped part from the punch, without there being any danger of damaging the sealing.

Furthermore, the present invention relates to an ultrasonic processing device for stamping stamped parts out of stamping material and for sealing the stamped parts to unprocessed products. According to the invention, a stamp-sealing unit is used as described.

In a preferred embodiment, the ultrasonic processing device has a frame to which the die plate is fastened. Furthermore, a drive unit is provided, which engages on the sonotrode plate and can move the latter relative to the die plate. Between drive unit and sonotrode plate, a compensating coupling can be provided, with which the minor difference between the movement direction of the drive unit and the movement direction of the column guide can be compensated for. The drive unit can for example have a piston which can be actuated hydraulically or pneumatically. As the forces to be applied by the sonotrode during stamping and during sealing differ, the drive unit can have two pistons with different effective cross-sections, wherein one piston is provided for applying the stamping force and the other piston for applying the sealing force.

Alternatively, the drive unit can have an electric motor, e.g. a servo motor.

In a further particularly preferred embodiment, a feed of stamping material and a feed of unprocessed products are provided, wherein the feed of stamping material and the feed of unprocessed products are arranged on opposite sides of the die plate.

Further advantages, features and possible applications of the present invention become clear with the aid of the following description of a preferred embodiment and the associated figures. There are shown in.

FIG. 1 shows an embodiment of a stamp-sealing unit according to the invention. The stamp-sealing unit has a sonotrode plate 1 and a die plate 2. The two plates are connected to each other via a column guide. The column guide has four guide columns 3, which are screwed to the die plate 2 and are movably guided inside guide sleeves 4, which are fastened in corresponding holes in the sonotrode plate 1. The sonotrode plate 1 can then be moved back and forth, with respect to the die plate 2, along the guide columns 3. It is ensured via the column guide that the sonotrode plate 1 and the die plate 2 are arranged almost perfectly parallel to each other.

Figure 2:
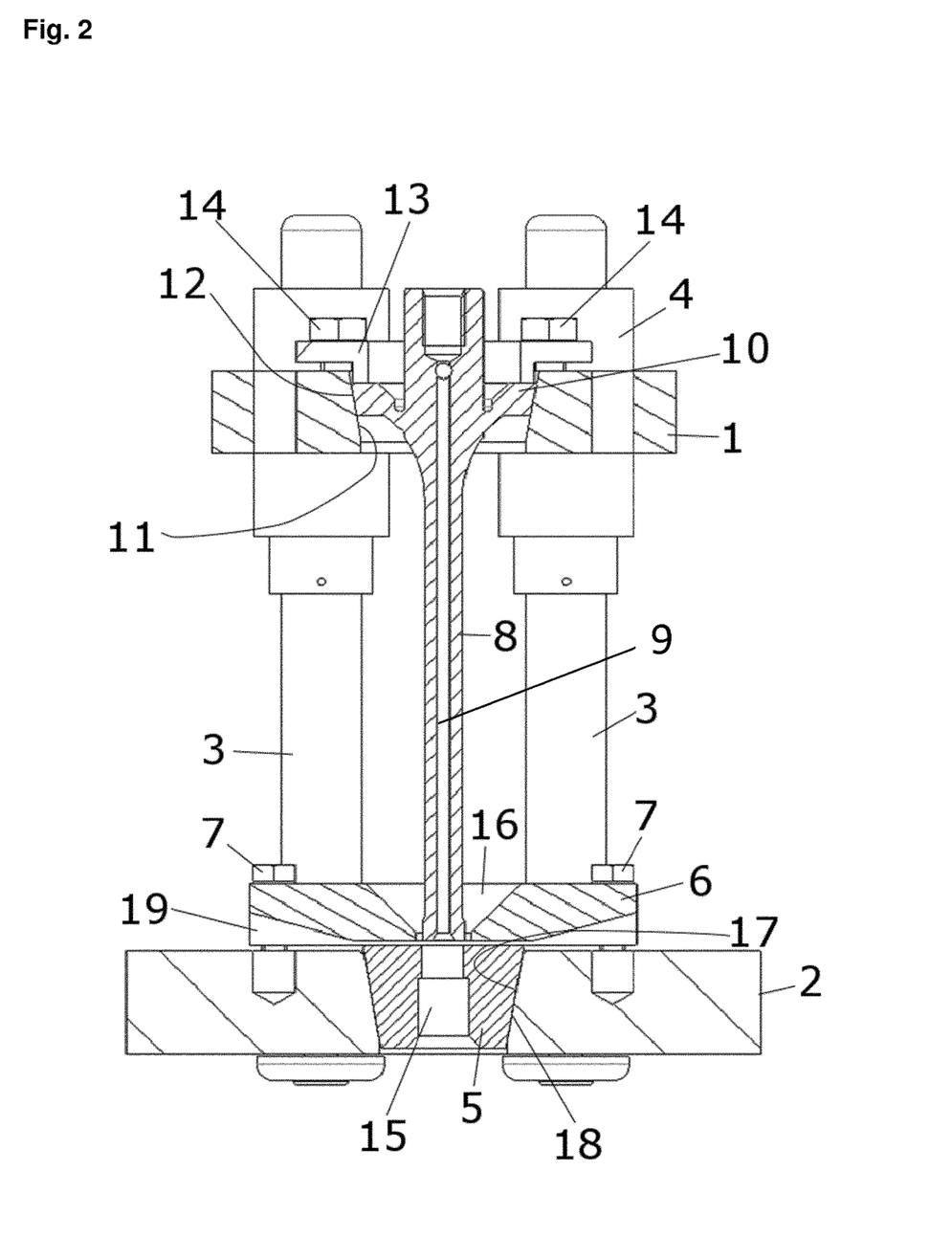
FIG. 2 a sectional view of the stamp-sealing unit of FIG. 1.

FIG. 2 shows a corresponding sectional view. It can be seen that a sonotrode 8 formed as a stamping punch is arranged in the centre between the four guide columns 3. The sonotrode 8 is formed rotationally symmetrical with respect to a longitudinal axis and, in the example shown, has a circular cross-section. In order to hold the sonotrode 8 on the sonotrode plate 1, the sonotrode has a flange 10, which extends bulge-like radially outwards. The flange 10 has a conical outer surface 12. The sonotrode plate 1 has an opening into which the sonotrode 10 is inserted. This opening has a conical inner surface 11. The inner cone 11 of the sonotrode plate 1 and the outer cone 12 of the sonotrode flange 10 are formed corresponding to each other. This leads to a precise alignment of the axis of the sonotrode perpendicular to the surface of the sonotrode plate. In order to prevent a movement of the sonotrode 8 upwards relative to the sonotrode plate 1 in FIG. 2, a clamping element 13 is provided. This clamping element 13 is substantially sleeve-shaped with a collar extending radially with respect to the sleeve. The collar of the clamping element 13 has corresponding openings through which screws 14 are guided and fasten the collar of the clamping element 13 to the sonotrode plate 1. The sleeve itself is situated mostly inside the opening in the sonotrode plate 1 and provides a stop surface for the sonotrode 8 or the flange 10 of the sonotrode. In the position of the clamping element 13 shown, the sonotrode cannot be moved relative to the sonotrode plate 1 in the direction of the die plate 2, as this is prevented by the corresponding cones 11, 12. A relative movement of the sonotrode 8 in the opposite direction is, conversely, prevented by the arrangement at the clamping element 13. As a result, the clamping element 13 not only has the effect of clamping the sonotrode, but also of transmitting force to the sonotrode 8.

The die plate 2 likewise has an opening with a conical inner surface 17. The die 5, which has a conical outer surface 18, is accommodated in this opening. Here too, the conical outer surface 18 of the die 5 and the conical inner surface 17 of the die plate 2 are designed corresponding to each other. The die 5 has an opening 15, the inner contour of which, at least in sections, approximately corresponds to the outer contour of the sonotrode 8. Furthermore, a strip guiding element 6 is provided, which is fastened to the die plate 2 with screws 7. The strip guiding element 6 has an opening 16 which is flush with the opening 15 in the die. Between the strip guiding element 6 and the die plate 2, a gap 19 is formed, through which the strip-shaped stamping material can be guided. Alternatively, the strip guiding element can be formed movable, with the result that it is movably guided between a clamping position in which the strip guiding element clamps the strip on the die and/or the die plate, and a guiding position in which the strip is movably guided between strip guiding element and die and/or die plate. In the embodiment shown, the strip guiding element comes into contact in sections with the die and firmly clamps the latter inside the die plate. The strip guiding element thus also functions as die clamping element.

In the embodiment shown, the sonotrode plate 1 can now be moved via the column guide along the guide columns 3 relative to the die plate 2, with the result that the front surface of the sonotrode 8, which acts as a punch, is inserted into the opening 15 in the die 5. If stamping material is situated in the gap 19 between die 5 and strip guide 6, a stamped part the size of the front surface of the sonotrode 8 is stamped out of the strip and transported downwards through the opening 15, in order to be welded to the unprocessed product by means of ultrasound in the next processing step. In order to ensure reliable transport of the stamped part through the opening 15 in the die, the sonotrode 8 has a channel 9 which can be connected to a vacuum or to a compressed air source, with the result that the stamped part can be sucked onto the front surface of the sonotrode or pushed away therefrom. In a preferred embodiment, the sonotrode is excited with ultrasound only during the sealing process, but not during the stamping process. In an alternative embodiment however, the ultrasound excitation also occurs during the stamping process.

Figure 3:
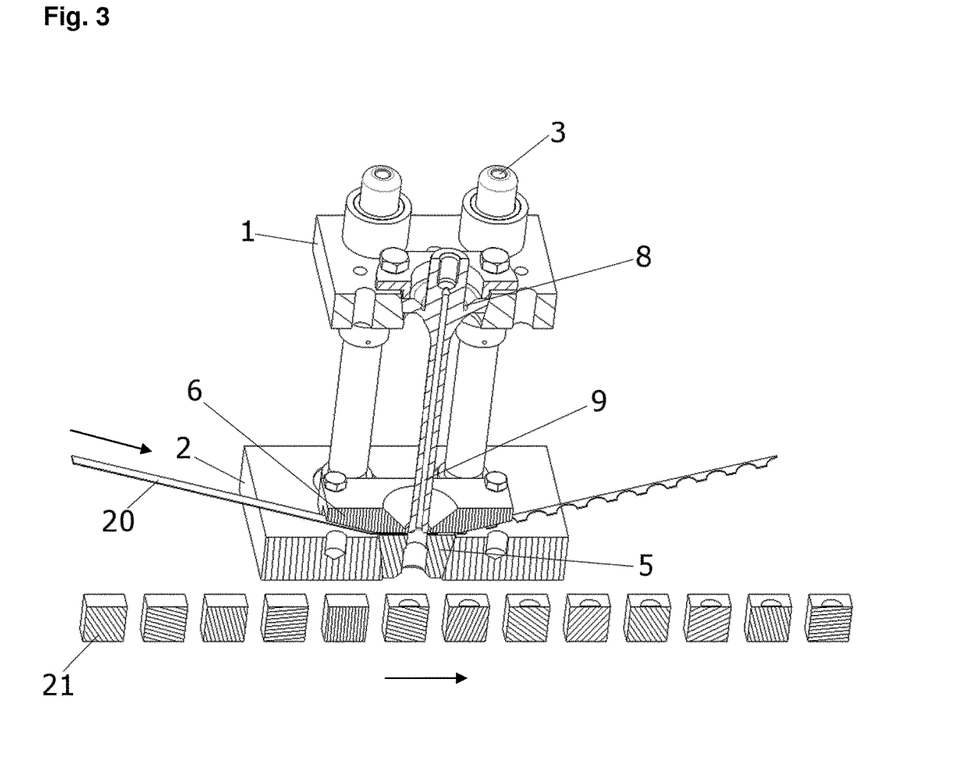
FIG. 3 a perspective sectional view of the stamp-sealing unit of FIG. 1.

FIG. 3 shows a perspective sectional view, wherein here the strip-shaped stamping material as well as the unprocessed product is now additionally represented. When the sonotrode plate 1 is moved in the direction of the die plate 2, the sonotrode 8 is moved through the strip guiding element 6, with the result that the stamped part, e.g. a membrane, is stamped out of the strip 20. Because of the channel 9, the front surface can now suck in the stamped part until the sonotrode has passed through the opening 15 and the stamped part comes to rest on the unprocessed product 21 provided. In this position, the sonotrode 8 is subjected to an ultrasonic oscillation, with the result that the stamped part is welded to the unprocessed product 21. The connection to the vacuum source is closed and, optionally, the channel 9 is supplied with a fluid such as e.g. compressed air and the sonotrode plate 1 is again moved away from the die plate 2. After this, both the strip-shaped stamping material 20 and the series of unprocessed products 21 are moved further and a new stamp-sealing process begins.

Figure 4:
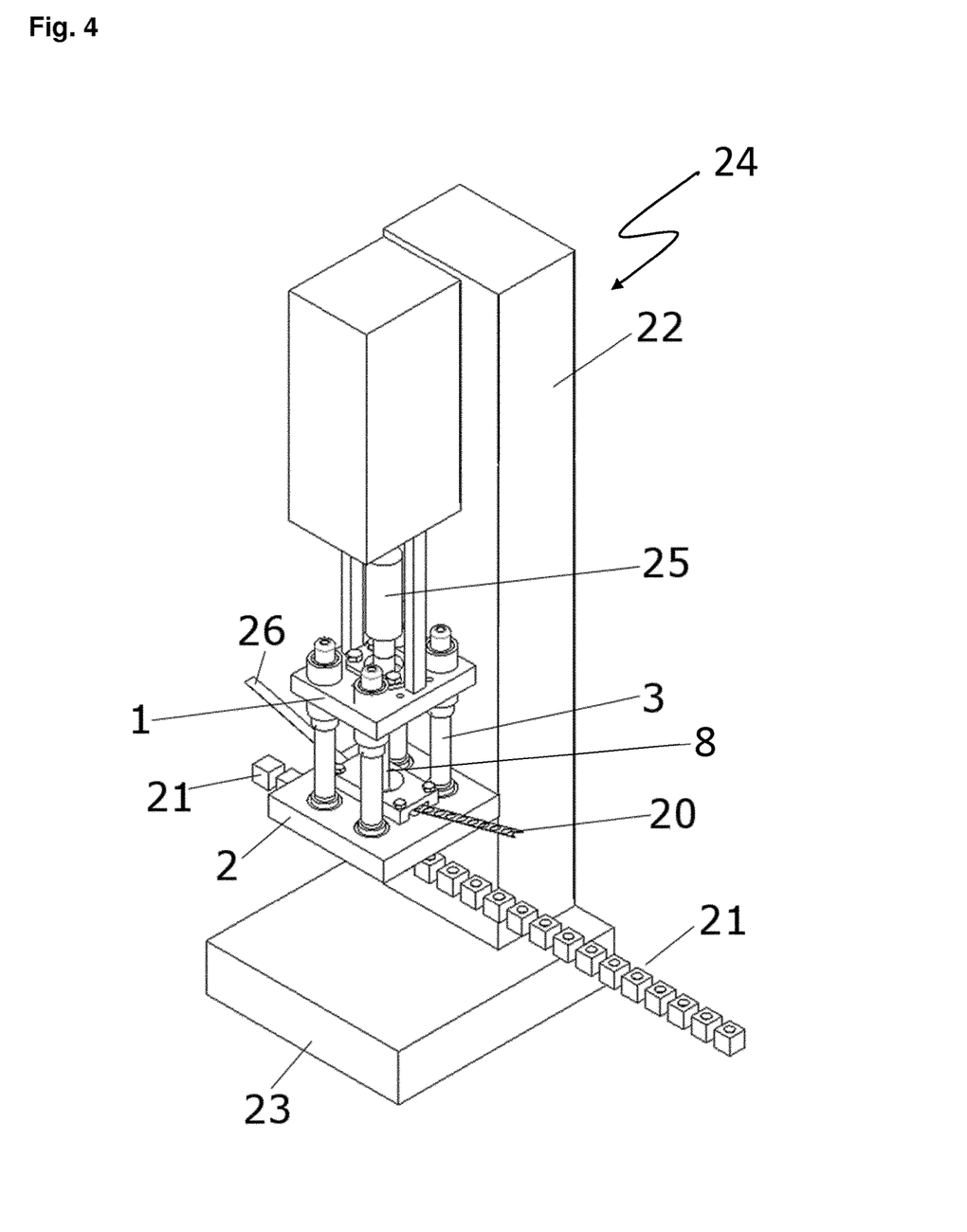
FIG. 4 a perspective view of an ultrasonic processing unit with the stamp-sealing unit of FIGS. 1 to 4, FIG. 5 a side view of an alternative embodiment of a sonotrode of a stamp-sealing unit according to the invention and FIG. 6 a sectional view of the embodiment of the sonotrode of FIG. 5.

FIG. 4 shows a corresponding ultrasonic processing device with a corresponding stamp-sealing unit. The unit has a device base 23, on which a corresponding device frame 22 is mounted. The die plate 2 is fastened to the frame 22. Alternatively, the die plate could be fastened to the device base 23. A drive unit 24 is provided, which engages on the sonotrode plate 1 and can move the latter, via the guide columns 3, relative to the die plate 2. In order to subject the sonotrode 8 to an ultrasonic oscillation, a converter 25 is provided. The sonotrode 8 can also be equipped with an amplitude transformer. In this case, the flange can also be arranged on the section of the sonotrode forming the amplitude transformer.

Figure 5:
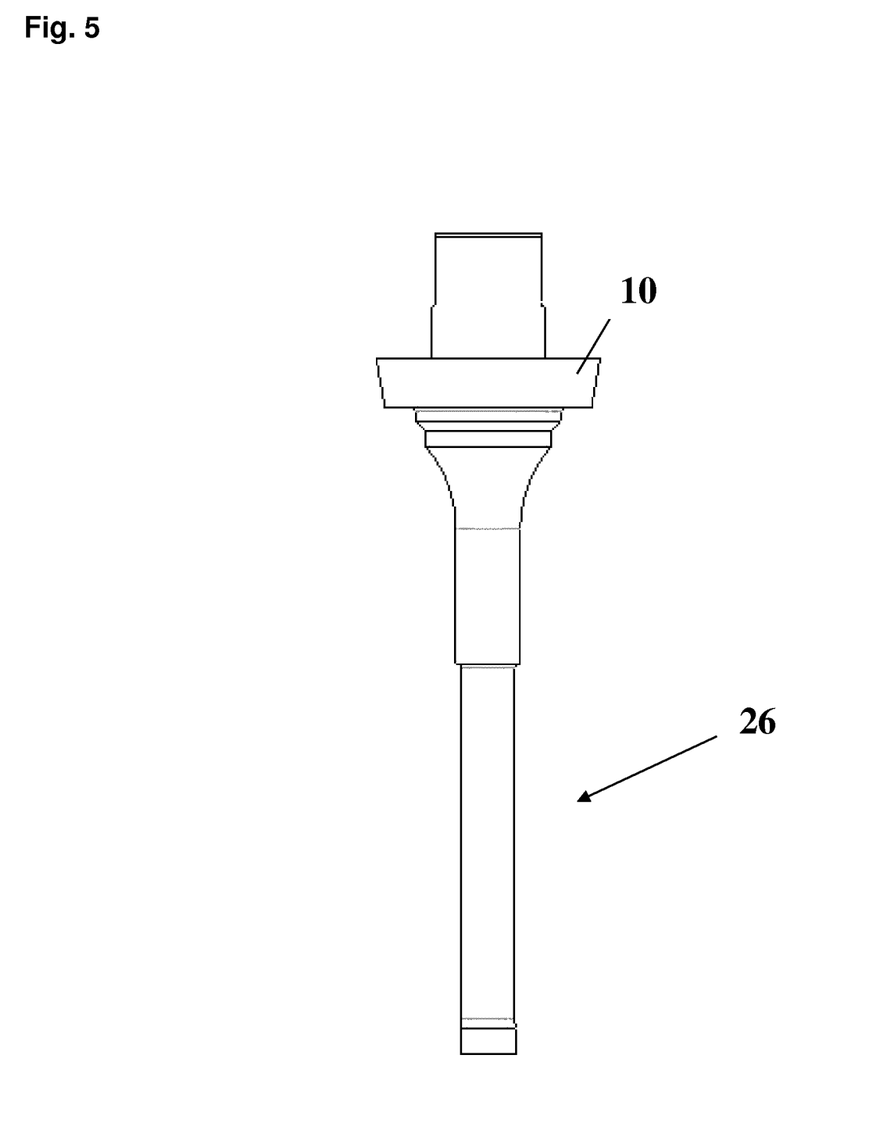
Figure 6:
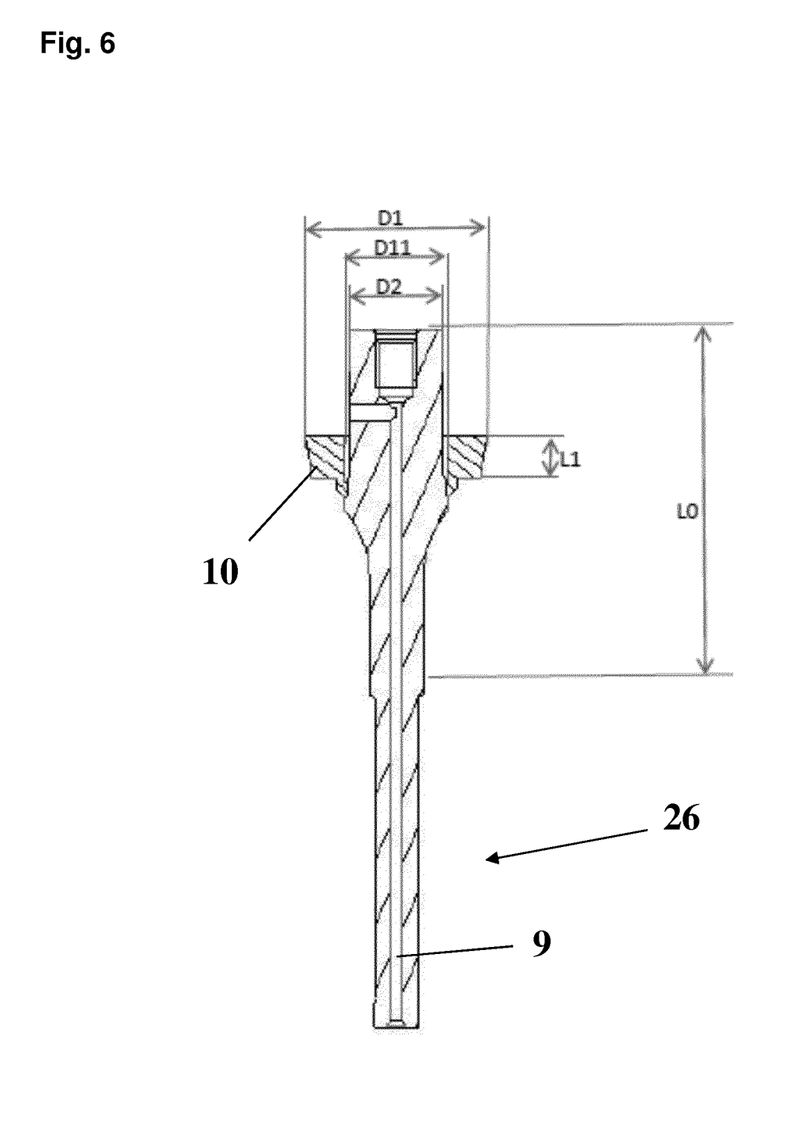

FIGS. 5 and 6 show an alternative embodiment of a sonotrode 26. This sonotrode 26 differs from the sonotrode shown in the previous figures, in that the sonotrode flange 10 is not formed in one piece with the sonotrode 26, but is shrunk onto the latter. Alternatively, the sonotrode flange 10 could also be welded or soldered onto the sonotrode.

The following preferred dimensions apply to all the embodiments. The outer diameter of the flange is denoted D1 and the inner diameter of the flange is denoted D11. The cone angle of the flange and the inner surface of the sonotrode plate opening is preferably between 5° and 30° and at best is approximately 10°. The half wavelength of the ultrasonic oscillation is denoted L0. The whole sonotrode thus has a length which corresponds to a complete wavelength of the resonant ultrasonic oscillation. The thickness of the flange (clamping surface height) is denoted L1 and is preferably at least L0/20 and at most L0/2. At best, the thickness of the flange is selected to be L0/10 (one-tenth of the half wavelength). The clamping surface height should not be selected too small, in order to guarantee a centering accommodation in the sonotrode plate.

In an alternative embodiment, the sonotrode only has a length which corresponds to a half wavelength of the resonant ultrasonic oscillation. All the other preferred dimensions named also apply to the shorter version of the sonotrode.

In a further embodiment, it is provided that the sonotrode flange 10 is shrunk into the opening of the sonotrode plate.

In order to carry out the stamp-sealing process, the strip 20 is first positioned inside the strip guiding element 6. The sonotrode 8 is initially in a home position in which the punch is positioned above the strip. The channel 9 is now connected to a vacuum source and the sonotrode moved downwards, with the result that the sonotrode tip is moved through the die and stamps a stamped part out of the strip. Through the application of vacuum to the channel 9, the stamped part is held on the sonotrode and moved into the vicinity of the unsealed unprocessed product. This movement is also referred to as a stamping stroke. Directly before, and at the latest when the stamped part touches the unprocessed product 21, the sonotrode is subjected to ultrasound. The oscillating sonotrode 8 is moved, during the subsequent sealing process, approximately in the direction of the unprocessed product 21, in order to exert a welding force on the stamped part. This movement is also referred to as a welding stroke. During the sealing process, the connection between channel and vacuum source can be separated.

As soon as the sealing process is completed, the sonotrode is again moved upwards into its home position and the strip 20 is moved further inside the strip guiding element. The next stamp-sealing process can then follow.

REFERENCE NUMBERS

1 Sonotrode plate
2 Die plate
3 Guide column
4 Guide sleeve
5 Die
6 Strip guiding element
7 Screws
8 Sonotrode
9 Channel
10 Sonotrode flange
11 conical inner surface
12 conical outer surface
13 Clamping element
14 Screws
15 Opening
16 Opening
17 conical inner surface
18 conical outer surface
19 Gap
20 Strip
21 Unprocessed product
22 Device frame
23 Device base
24 Stamp-sealing unit
25 Converter
26 Sonotrode

The invention claimed is:

1. Stamp-sealing unit with a punch formed as a sonotrode (8) and a die (5), wherein the die (5) has an opening (15) and the punch can be moved into and out of the opening (15) in the stamping direction, characterized in that a sonotrode plate (1) is provided with a sonotrode plate opening for accommodating the sonotrode, wherein the sonotrode (8) has a flange (10), and the sonotrode plate opening has an inner contour with a stop surface and the flange has an outer contour with a stop surface, wherein the two stop surfaces are formed corresponding to each other with the result that, when the sonotrode is accommodated in the sonotrode plate opening, the stop surfaces lie against each other, wherein the inner contour has an inner cone and the outer contour has an outer cone which is formed corresponding to the inner cone.

2. Stamp-sealing unit according to claim 1, characterized in that the flange is designed circumferential.

3. Stamp-sealing unit according to claim 1, characterized in that a clamping element (13) is provided, which comes into contact both with the sonotrode plate (1) and the flange, and is arranged such that it prevents a linear relative movement between flange and sonotrode plate (1).

4. Stamp-sealing unit according to claim 1 characterized in that the die (5) is fastened to a die plate (2) and the die plate (2) has a die plate opening into which the die (5) is inserted.

5. Stamp-sealing unit according to claim 4, characterized in that the die plate opening has an inner contour and the die has an outer contour, wherein the outer contour of the die and the inner contour of the die plate are designed corresponding to each other.

6. Stamp-sealing unit according to claim 5, characterized in that a die clamping unit is provided, which is preferably fastened to the die plate (2) with one or more screws (7, 14) and is in contact, at least in sections, with the die (5).

7. Stamp-sealing unit according to claim 6, characterized in that the die clamping unit has an opening (15, 16) which is flush with the die opening.

8. Stamp-sealing unit according to claim 5, characterized in that the inner cones of the sonotrodeplate (1) and the die plate (2) as well as the outer cones of sonotrode flange (10) and die (5) have the same cone angle in each case.

9. Stamp-sealing unit according to claim 1, characterized in that the sonotrode plate is connected, via a straight guide, to the die (5) or the die plate (2) to which the die (5) is fastened, wherein the straight guide is preferably a column guide.

10. Stamp-sealing unit according to claim 9, characterized in that the straight guide is a column guide and has at least two columns which are screwed to the die plate (2), and the sonotrode plate (1) has guide openings for accommodating the columns.

11. Stamp-sealing unit according to claim 1, characterized in that the sonotrode (8) has a fluid channel with an inlet which is arranged on the surface of the sonotrode (8) facing the die (5), and an outlet which can be connected to a vacuum source and/or compressed air source.

12. Ultrasonic processing device for stamping stamped parts out of stamping material and for sealing the stamped parts to unprocessed products, characterized in that a stamp-sealing unit according to claim 1 is provided.

13. Ultrasonic processing device according to claim 12, characterized in that a frame to which the die plate (2) is fastened, and a drive unit which engages on the sonotrode plate (1) and can move the latter relative to the die plate (2) are provided.

14. Ultrasonic processing device according to claim 12 characterized in that a feed of stamping material and a feed of unprocessed products are provided, wherein the feed of stamping material and the feed of unprocessed products are arranged on opposite sides of the die plate (2).

15. Stamp-sealing device according to claim 3, wherein the clamping element (13) consists of a sleeve with a collar element, wherein the sleeve is positioned inside the sonotrode plate opening and the collar element is fastened to the sonotrode plate (1) preferably using one or more screws (7, 14).

16. Stamp-sealing device according to claim 5, wherein the inner contour of the die plate has an inner cone and the outer contour of the die (5) has an outer cone, wherein the outer cone of the die (5) is formed corresponding to the inner cone of the die plate opening.

17. Stamp-sealing device according to claim 6 wherein between die clamping unit and die (5), a gap (19) is formed in sections, for feeding in stamping material.

18. Stamp-sealing device according to claim 10, wherein a guide sleeve (4) is arranged between the columns and the guide openings in each case.

* * * * *